April 13, 1948. F. W. SCHEINEMAN 2,439,582
CATALYTIC CONVERSION SYSTEM
Filed March 31, 1944 2 Sheets-Sheet 1

Inventor
Fred W. Scheineman
By Donald E. Payne
Attorney

April 13, 1948. F. W. SCHEINEMAN 2,439,582
CATALYTIC CONVERSION SYSTEM
Filed March 31, 1944 2 Sheets-Sheet 2

Inventor
Fred W. Scheineman
By Donald E. Payne
Attorney

Patented Apr. 13, 1948

2,439,582

UNITED STATES PATENT OFFICE 2,439,582

CATALYTIC CONVERSION SYSTEM

Fred W. Scheineman, Chicago, Ill., assignor to Standard Oil Company, Chicago, Ill., a corporation of Indiana Application March 31, 1944, Serial No. 528,963

11 Claims. (Cl. 23—288)

This invention relates to a catalytic conversion system and it pertains more particularly to an improved method and means for converting hydrocarbon oils by contacting the vapors thereof with porous solid catalysts of small particle size suspended in hydrocarbon vapors, regenerating the catalyst while it is suspended in regeneration gas at a high elevation and returning the regenerated catalyst to the contacting step. This is a continuation-in-part of my copending application S. N. 392,848, filed May 10, 1941.

An object of the invention is to provide a unitary apparatus for effecting contact between the hydrocarbon vapors and the catalyst in one zone and effecting regeneration of the catalyst in a contiguous upper zone by oxidation with air or other oxygen-containing gases. A further object is to decrease the amount and size of equipment required for a unit of given capacity and to decrease both investment and operating costs.

A further object is to minimize expansion problems and difficulties in an "above-below" catalytic contacting unit and to avoid any strains in the structure due to temperature changes. A further object is to provide improved valve closures and valve operating means in a system wherein the valve operating means must extend through a wall which is relatively movable with respect to the valve closure. A further object is to provide improved flow control means for aerated solid catalyst material of small particle size and to avoid any valve sticking which might be caused by catalyst solids getting between surfaces which are subjected to sliding contact.

A further object is to provide an improved method and means for stripping catalyst material inside a reaction zone. A further object is to prevent undue mixing of stripped catalyst with unstripped catalyst in the event of pressure surges in the system. A further object is to provide improved methods and means for transferring catalyst from a reactor to a stripping zone and from the stripping zone in regulated amounts to a regeneration zone.

A further object is to minimize air compression costs for catalyst regeneration and to provide improved methods and means for returning spent catalyst to the regenerator and distributing catalyst in the regenerator. Other objects will be apparent as the detailed description of the invention proceeds.

In copending application 392,848 it is pointed out that the regenerator may be superimposed above the reactor. This particular arrangement has been found to offer remarkable operating advantages and to effect material savings in both construction costs and operating expenses. The pressure at the top of the regenerator may be only about 1 to 3 pounds per square inch gauge and the pressure head of catalyst in the regenerator may be an additional 1 to 4 pounds which means that the air compressor need only discharge the compressed air at a pressure of the order of about 5 or 6 pounds per square inch which is only about half as great as would be required if these vessels were at approximately the same level. The standpipes leading from the dense phase in the generator to the dense phase in the reactor may provide an additional 6 or 8 pounds pressure head so that the standpipe can effectively serve as a seal between the reactor and the regenerator as well as providing the head required for catalyst flow even though the reactor is operated at a top pressure of the order of 7 or 8 pounds per square inch so that reaction vapors may be introduced without compression to a fractionating column.

A feature of my invention is the use of an internal stripping zone in the reaction chamber which is laterally partitioned therefrom. When the top of the stripping zone communicates directly with the dense phase in the reactor, any surging in the stripping zone or reaction zone may cause undue amounts of intermingling between stripped catalyst and unstripped catalyst with the result that unstripped catalyst may be discharged from the base of the stripping zone and/or stripped catalyst may be unintentionally returned to the reactor. By carrying the partition between the stripping zone and the reaction zone above the level of the dense catalyst phase and by introducing catalyst from the dense phase in the reaction zone into the stripper through openings in this partition wall at flow rates of about 2 to 12 feet per second I avoid such undue intermingling even though the catalyst level may rise materially in one zone with respect to the level in the other zone on account of pressure surges.

By providing a large vertical cylindrical conduit substantially concentric with the reactor and communicating at its upper end with the cone-shaped base of the regenerator I not only save considerably in construction costs but obtain heat exchange in the reactor with the regenerator inlet conduit as well as with the regenerated catalyst standpipe. With this particular construction the only expansion joint necessary in the system is that between the compressed air inlet line, which communicates with the base of the inner conduit, and the bottom wall of the unitary vessel which houses the reaction, stripping and regeneration zones.

The rate at which stripped catalyst is returned to the regenerator is controlled by closures movable toward and away from valve seats carried in the inner conduit wall and this closure is designed to throttle the flow of aerated solids in partially open position and to effect a gas-tight seal without crushing undue amounts of catalyst when in fully closed position. Since the control means for this valve extends through the chamber wall which is relatively movable (on account of differential expansion) with regard to the inner conduit I have provided methods and means for operating the valve closure which are operable regardless of differential expansion and are not materially affected thereby.

Thus stripped catalyst passes in regulated amounts through openings at the base of the inner conduit and is carried upwardly with compressed air through said conduit, the initial combustion which takes place within this conduit serving to supply heat to the stripper and reactor. The catalyst-air stream is distributed into the regenerator and a dense phase of catalyst maintained therein for sufficient period to effect the desired regeneration. Catalyst is returned from the dense phase in the regenerator through an internal standpipe to a low point in the reactor zone, the standpipe being carried by the partition which forms the lower wall of the regenerator and the upper wall of the reactor. The catalyst completes the circuit by passing through lateral openings through the vertical partition which separates the reaction zone from the stripping zone and is then ready for reintroduction into the upflowing air stream. The invention will be more clearly understood from the following detailed description read in conjunction with the accompanying drawings which form a part of the specification and in which:

As a specific example of my invention I will described a 20,000 barrel per day catalytic cracking unit for producing motor fuel from conventional gas oil charging stocks. It should be understood, however, that my invention is not limited to catalytic cracking but is applicable to a wide variety of other conversion processes such as catalytic reforming, isomerization, hydrogenation, dehydrogenation, aromatization, desulfurization, etc. My invention is also applicable to catalytic processes generally such as oxidation, reduction, chlorination, etc. and it is even applicable to processes where no chemical conversion is effected such, for example, as processes of adsorption and desorption.

Figures 1, 2:
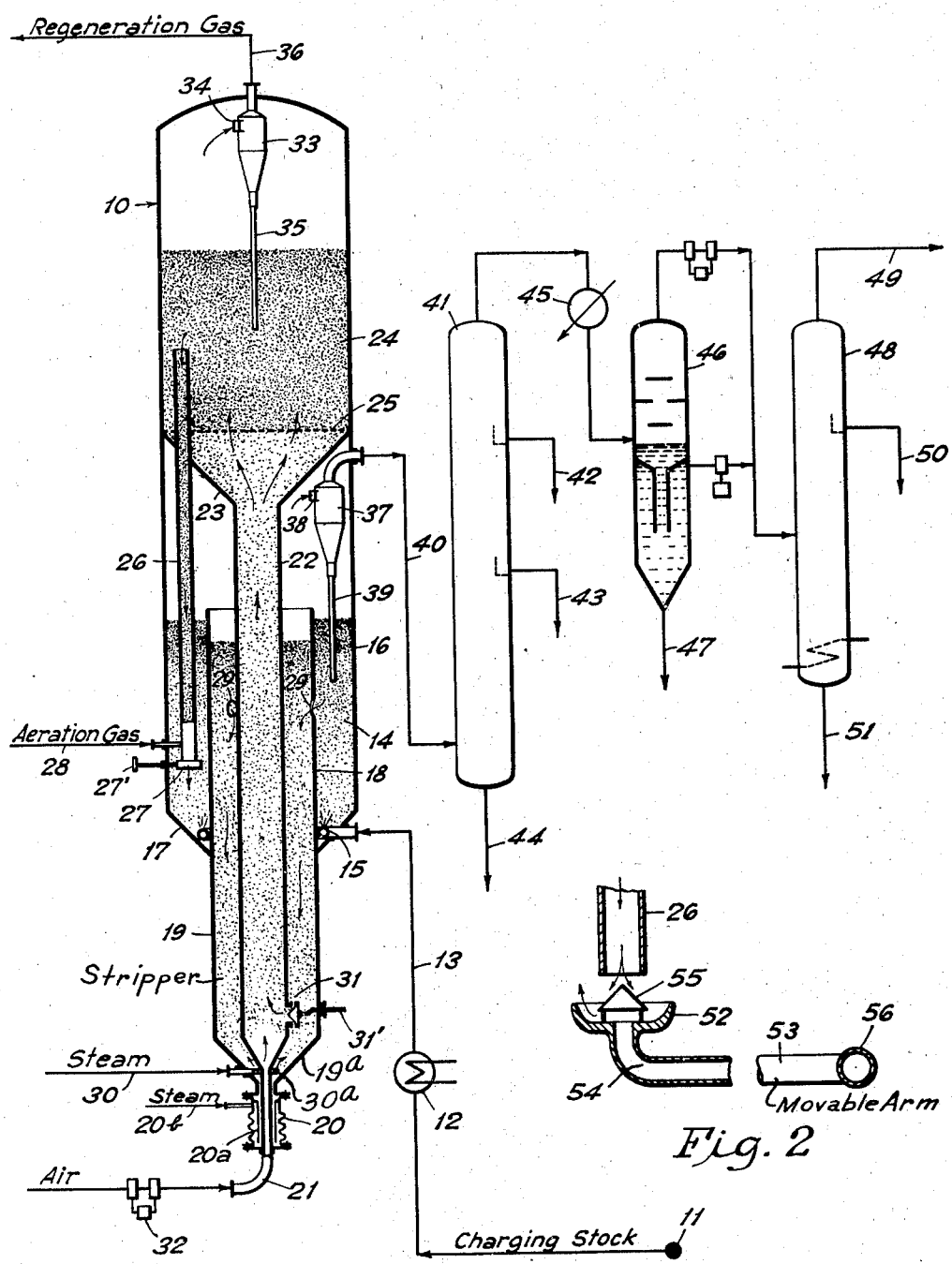
Figure 1 is a schematic vertical section through my improved unitary reactor-regenerator system and a schematic flow diagram of the product fractionation.
Figure 2 is a detailed section illustrating a modified form of valve to be used in the apparatus of Figure 1 for controlling catalyst flow.

Referring to Figure 1, tower 10 contains a reaction zone and regeneration zone with separation zones for the catalyst within each of these zones and with an internal stripping zone within the reaction zone. In operation, about 20,000 barrels per day of gas oil is charged from source 11 through heater 12 and transfer line 13 to reaction zone 14 in the lower part of tower 10. The heating zone may be a conventional pipe still but it is preferably a simple heat exchanger or plurality of heat exchangers and if the charging stock is not completely vaporized in the heater 12 it is quickly and almost instantaneously vaporized on its discharge from distributor 15 into contact with hot regenerated catalyst in or entering the reaction zone. The heat necessary for effecting the catalytic cracking is supplied by the hot catalyst from the regeneration zone since there is usually enough carbonaceous deposit on the spent catalyst to supply the necessary amount of heat. By recycling large quantities of catalyst the catalyst itself acts as a heat carrier and if desired an inert heat carrier material may be admixed with the catalyst. For catalytic cracking the temperature in the reaction zone is preferably within the approximate range of 800 to 1050° F., e. g., about 900° F. The pressure in the upper part of the reaction zone may be about 8 pounds per square inch and at the base thereof may be about 10 to 12 pounds per square inch depending on the depth of the dense catalyst phase therein.

The catalyst itself may be of the silica-alumina or silica-magnesia type. Such a catalyst may be prepared by the acid treating of natural clays such as bentonite or montmorillonite or by incorporating a metal oxide such as alumina, magnesia, thoria, zirconia, etc., with activated silica. One method of preparing a catalyst is by ball-milling silica hydrogel with alumina or magnesia using about 2 to 30% of alumina or magnesia. The ball-milled dough may be dried at about 240° F. and then activated by heating to a temperature of about 900 to 1000° F. No invention is claimed in the composition or preparation of the catalyst per se and it is therefore unnecessary to describe the catalyst in further detail.

The catalyst may be in powdered form or in the form of small spherical particles with a particle size of about 10 to 100 microns. The invention is applicable, however, to other catalyst sizes, i. e., up to 200 microns or even to 10 or 20 mesh screen size, provided only that the catalyst be of such size and density that it may be aerated and handled as a fluid in the manner herein described. The vertical gas or vapor velocity in the reactor and regenerator for this finely divided catalyst should usually be within the approximate range of 1 to 2½ or 3 feet per second but with some catalysts it may be as low as .5 and with others it may be as high as 5 feet per second. With vertical gas velocities in this particular range, i. e., of about 1½ feet per second, the catalyst is maintained as a suspended turbulent dense phase which is superimposed by a light dilute phase. The density of the dense phase should be within the approximate range of .3 to .9 or within the more limited range of .5 to .6 times the bulk density of settled catalyst and in this particular case where the bulk density of settled catalyst is about 35 pounds per cubic foot the density of the dense catalyst phase may be within the approximate range of 10 to 25 pounds per cubic foot, usually about 18 to 20 pounds per cubic foot. The light dilute phase on the other hand is of very low density, usually below 1 pound per cubic foot although in that portion of the dilute phase immediately above the dense phase the bulk density may be as high as 5 pounds per cubic foot. The aerated catalyst in standpipes is usually even more dense than the dense phase catalyst in the contacting zone and sufficient aeration gas should be injected to maintain this catalyst in aerated liquid-like condition.

Referring again to Figure 1 the reaction zone is enclosed in a cylindrical chamber 16 which may be about 25 feet in diameter by about 40 feet in height. The cone-shaped bottom 17 of the reactor is welded to cylindrical baffle 18 which extends upwardly in vessel 16 to a level above the desired dense phase catalyst level. The space between the wall of vessel 16 and baffle 18 constitutes reaction zone 14.

The baffle wall 18 extends downwardly below its juncture with cone-shaped bottom 17 as vertical wall 19. The cone-shaped bottom 19a is provided with an expansion joint 20 through which extends compressed gas inlet line 21, the expansion joint permitting relative movement of conduit 21 with respect to the bottom wall 19a of the unitary chamber. The expansion joint may be of the bellows type with an internal sealing ring 20a, and to prevent solids from getting between the sealing ring and the bellows an inert gas such as steam may be introduced through line 20b and may continuously be blown past the sealing ring.

Conduit 21 communicates with vertical conduit 22 which is of larger cross-sectional area than conduit 21 and which, for example, may be about 7 feet in diameter, the cylindrical baffle 18 being in this case about 15 feet in diameter. Conduit 22 communicates at its upper end with conical bottom 23 of regenerator chamber 24, the regenerator in this case being a vertical extension of reactor chamber wall 16, i. e., about 25 feet in diameter and about 40 feet in height. The extension 19 of cylindrical baffle 18 may be about 20 feet in length so that the overall height of the structure is within the general vicinity of about 100 feet. It should be understood, however, that the regenerator section may be of larger diameter than the reactor section so that the upper walls of the reactor are simply welded to the outwardly extending conical bottom 23 and by increasing the diameter of the regenerator to about 35 to 40 feet the depth of the dense phase may be cut in half. A distributor 25, which may be a perforated plate suitably supported is preferably employed at the base of the regenerator in order to evenly distribute the upflowing stream which enters the regenerator through conduit 22.

Catalyst is removed directly from the dense phase in the regenerator by one or more standpipes 26 which extend through and may be welded to and supported by the conical bottom 23 of the regenerator which also serves as the top of the reactor. The upper end of standpipe 26 communicates with the dense catalyst phase about 5 or 10 feet above distributor 25 and it serves to conduct this catalyst in aerated form to a low point in the reaction zone 14. With a pressure in the top of the regenerator of about 2 to 2½ pounds per square inch the pressure immediately above distributor 25 may be about 4½ pounds per square inch and the pressure immediately below this plate may be about 5 pounds per square inch. Due to the pressure head of aerated catalyst in standpipe 26 (which is superimposed by the pressure head of the dense phase in the regenerator and the pressure at the top of the regenerator) the pressure at the base of the standpipe may be about 11 pounds per square inch while the pressure in the reaction zone at a corresponding level is only about 9 pounds per square inch. This pressure differential is sufficient to insure a downward flow of the catalyst through conduit 26 into the reaction zone and to prevent any gases from the reaction zone from flowing upwardly to the regenerator. A single standpipe about 4 feet or more in diameter may be employed or I may employ a plurality of standpipes about 3 feet in diameter in order that the catalyst may be more readily distributed into the reaction zone. The rate at which catalyst enters the reaction zone may be controlled by a valve 27 provided with means 27' extending through the chamber wall for controlling the position of the valve. An ordinary gate valve may be employed for this purpose or the valve described in connection with Figure 2 or any other suitable valve means known to the art (such as valve 21 of U. S. 2,341,193). The valve operating means may be provided with suitable linkages or slide connections to make allowance for differential expansion as will be described in more detail in connection with Figures 3 to 5.

The amount of catalyst employed in the reaction zone may vary considerably by operating at relatively high or relatively low dense phase catalyst levels but in any case I prefer to operate at a catalyst level below the upper end of baffle 18. The vapor contact time in the reactor may be about within the approximate range of 3 to 30 seconds but preferably about 10 to 15 seconds. The catalyst residence time in the reactor may be varied throughout a relatively wide range depending on the catalyst-to-oil ratios employed. Usually catalyst residence time will be about 1 to 10 minutes or more. The space velocity may be about 1 or 2 volumes of liquid oil charged per hour per volume of settled catalyst in the reaction zone (i. e., based on settled volume rather than the dense phase volume) although space velocities may be as low as .25 or as high as 8 or 10.

Catalyst is discharged from the reaction zone through openings 29 in baffle 18 into the stripping zone which lies between baffle 18 and conduit 22. Openings 29 may be about 2 or 3 feet in diameter and about 2 to 8 or more in number; they should be of such size and number as to result in a velocity of about 2 to 12, preferably about 5 to 10 feet per second for the catalyst flow into the stripping zone. The catalyst residence time in the stripping zone may be about one minute and the upward steam velocity therein may be about 1 foot per second, the amount of stripping steam being about two times the volume of gas in the catalyst introduced into the stripping zone. Such stripping steam may be introduced into line 30.

The pressure in the lower part of the stripping zone may be about 13 pounds per square inch while the pressure at the corresponding level in conduit 22 is only about 6 or 7 pounds per square inch. By simply providing an opening in the lower part of conduit 22, aerated and liquid-like catalyst will thus flow rapidly into conduit 22 to be picked up by the incoming compressed gas and carried upwardly for distribution in the regenerator. It is important that the rate of flow from the stripper to conduit 22 be controlled and it is also important that a substantially gas-tight closure be provided for this opening so that if the catalyst level in the stripping zone falls too low, this opening may be closed in order to prevent any passage of compressed air into the reactor via the stripping zone. I therefore provide a valve means 31 at the base of conduit 22 which is readily controllable by means 31' extending outside of the vessel wall and here again it is important that the control means be designed to take into account possible relative movement due to expansion between the vessel wall and conduit 22. Particular types of valves and valve operating means for this purpose will be described in further detail in connection with Figures 3 to 5.

Compressed air for the regenerator is supplied by compressor 32 and it passes upwardly through conduits 21 and 22 through distributor 25 into the regenerator. Regeneration gases are withdrawn from the light dispersed catalyst phase at the top of the regenerator and if desired centrifugal separation means may be employed for returning any entrained catalyst particles back to the dense phase. Such means are diagrammatically illustrated by cyclone separator 33 with an inlet 34 communicating with the dispersed catalyst phase and a dip leg 35 extending into the dense catalyst phase, the gases leaving the top of the regenerator through line 36. Any desired system of catalyst separation may be employed and such systems will require no further detailed description particularly in view of my issued Patent 2,337,684.

Similarly a centrifugal separation system may be employed in the upper part of the reaction zone and such is diagrammatically illustrated by cyclone separator 37 provided with inlet 38 and dip leg 39. Reaction vapors from cyclone separation zone 38 are then conducted by line 40 to a fractionation system diagrammatically illustrated by fractionating tower 41 from which gas oil side streams may be withdrawn through lines 42 and 43 and from which a bottoms fraction may be withdrawn through line 44 and recycled with the feed stock in line 11. The overhead from tower 41 may be passed through cooler 45 to a separator 46 from which water may be withdrawn through line 47. The gaseous and liquid hydrocarbons from the separator may then be introduced into one or more high pressure fractionation systems diagrammatically illustrated by column 48 from which light gases are taken overhead through line 49, a $C_3$—$C_4$ fraction through line 50 and a gasoline fraction through line 51.

The operation of the above system will now be described in more detail. About 253,500 pounds per hour of charging stock vapors along with about 8000 to 9000 pounds per hour of steam is introduced through distributor 15 at the base of the reaction zone. About 1,500 pounds per hour of catalyst recovered from line 44 may be introduced with about 12,300 pounds per hour of slurry oil with the charging stock. The charging stock may be introduced at reaction temperature. It may be superheated if the heat introduced into the reactor with regenerated catalyst is insufficient to maintain the desired reaction temperature. Usually however the heat which is stored in the catalyst in the regenerator and which is given up by the catalyst in the reaction zone is more than enough to accomplish the desired conversion so that the temperature of the incoming charging stock stream may be correspondingly lowered. I prefer to avoid the use of external cooling means for the regenerator and to balance the heat of reaction with the heat of regeneration by varying the temperature of the incoming charging stock. It should be understood, however, that cooling means may be employed in the regenerator or catalyst may be recycled from the regenerator through a cooler and thence back to the regenerator as in manners now known to the art.

Hot regenerated catalyst at a temperature of about 1025° F. is introduced from the base of standpipe 26 into the reactor at the rate of about 3,800,000 pounds per hour. This catalyst is uniformly dispersed throughout the entire dense phase in the reactor and it supplies the heat of cracking while maintaining a reactor temperature of the order of about 900° F. As much as 4000 pounds per hour of aeration steam may be required through line 28 but this amount may be much less and in fact may be negligible when the system is on-stream.

Catalyst is withdrawn from the reaction zone through openings 29 into the stripping zone at the same rate as catalyst is introduced into the reactor. About 11,000 or 12,000 pounds per hour of stripping steam may be introduced through line 30 and distributed in the base of the stripping zone by distributor 30a. Stripped catalyst is discharged from the stripping zone through throttle valve 31 and it is picked up with about 152,500 pounds per hour or approximately 34,000 cubic feet per minute of air (measured at 60° F. and atmospheric pressure) which has been compressed in a compressor 32 to a pressure of about 7 pounds per square inch. This compressed air stream picks up the catalyst which passes through throttling valve 31 and carries the catalyst up through conduit 22. The compressed air-catalyst stream is uniformly distributed in the regenerator by perforated plate 25. The regeneration gases leave the top of the regenerator at a pressure of about 2 pounds per square inch. The product stream leaves the top of the reactor, however, at a pressure of about 8 pounds per square inch which pressure is desirable for operating the scrubbing and fractionating column 41.

Since no invention is claimed in the fractionation system per se it will not be described in detail. The operations hereinabove described may yield about 900 barrels per day of residual oil withdrawn through line 44 from which catalyst may be separated and returned to the reactor with slurry oil. It may yield about 4,900 barrels per day of heavy gas oil and an approximately equal volume of light (35° A. P. I.) gas oil and about 10,800 barrels per day of a 68° A. P. I. motor fuel stream from which can be recovered about 9000 barrels per day of 10 pound Reid vapor pressure gasoline and 1000 barrels per day of excess butanes and butylenes.

Referring more specifically now to the valve structures and valve operating means, Figure 2 illustrates a combined flow regulator and distributor suitable for use at the base of standpipes 26. The dish-shaped cap 52 is supported on a movable arm 53 or on other means for raising and lowering it toward or away from the lower end of standpipe 26. A channel 54 leads through the center of the dish-shaped cap to a deflecting head 55 which directs a current of gas from the channel downwardly into the dish thereby sweeping the dish free of catalyst which may fall into it. The cross-sectional area of the head 55 should be nearly the same as the cross-sectional area of the outlet from standpipe 26 in order to provide a support for the catalyst in the standpipe. The rate of catalyst flow is regulated by controlling the space between the outlet of standpipe 26 and dish-shaped cap 52. When it is desired to stop the catalyst flow entirely the dish-shaped cap 52 is forced upwardly against the outlet. In this position gas flowing through channel 54 may enter the standpipe 26 and travel upwardly therethrough, aerating the catalyst in the standpipe and maintaining it in free flowing condition. The gas employed in channel 54 may be dry steam, flue gas or other suitable inert gas. The arm 53 may be attached to hollow shaft 56 which may extend through the wall of tower 10 to external control means.

Figure 3:
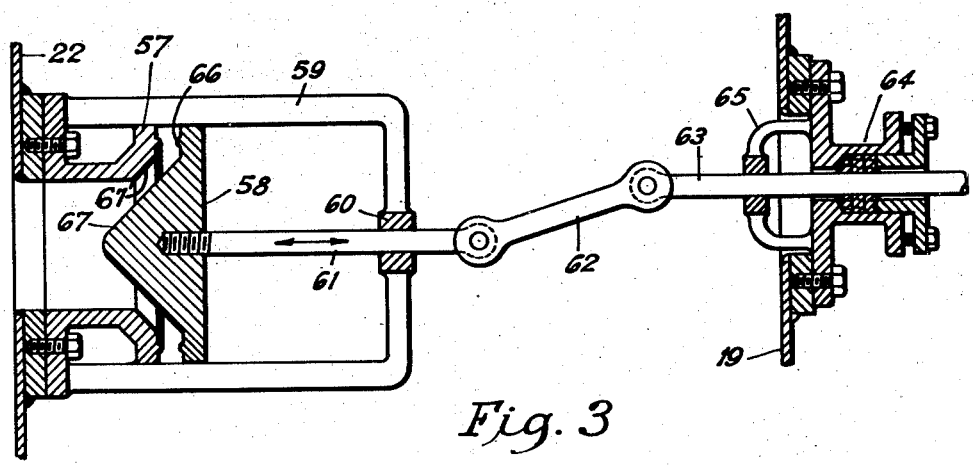
Figure 3 is a detailed section of the valve structure for controlling and stopping flow of catalyst from the stripper to the regenerator.

In Figure 3 I have illustrated a valve closure and operating means of the type for use at the bottom of conduit 22. A valve seat 57 is welded or otherwise secured to the wall of conduit 22 over the opening therein. A valve closure 58 is mounted to move toward and away from the valve seat and may be directed by suitable guide means such as spider 59 which also has an opening 60 to serve as a guide for rod 61 which is secured at one end to valve closure 58 and is pivotally connected at its other end with one end of connecting rod 62. The other end of connecting rod 62 is pivotally connected to control rod 63 which extends through suitable packing gland 64 secured to vessel wall 19. Guide means 65 may also be provided for insuring longitudinal motion of control rod 63. The control rod may be manually operated or operated mechanically, pneumatically, hydraulically or electrically in accordance with the pressure differential across the wall of conduit 22, i. e., in accordance with the pressure drop across this particular valve. The guide means insure that the valve will properly seat at all times and the pivoted connecting rod will accommodate any relative movement of conduit wall 22 and vessel wall 19 which is caused by differential expansion.

The flow of finely divided solids through a valve will inevitably cause a certain amount of erosion. Furthermore, if closure is to be effected by contact of extended surface area the solid particles between the surfaces would prevent complete closure and the particles themselves would be subjected to undesirable crushing. On either the valve seat or the valve closure, or both, I provide an annular sealing ring 66 which is fabricated from special hardened steel or other erosion-resistant material and which is tapered to provide an actual closure seat of very small cross-sectional area. By employing such a "knife edge" closure a substantially gas-tight seal may be obtained with minimum crushing of catalyst particles.

In order to prevent the wearing away of the valve sealing means by erosion I obtain the desired throttling by employing a cone-shaped surface 67 on valve closure 58 which surface is substantially parallel to a corresponding cone-shaped surface 67' on the inner side of the valve seat. Thus a passage of appreciable length is provided between surfaces 67 and 67' and this passage serves as a throttle for reducing the pressure on the fluidized solids from the approximately 13 pounds per square inch to the approximately 7 pounds per square inch. Surfaces 67 and 67' are likewise of erosion-resistant material but due to their large surface area they may be used for a long period of time without encountering the serious erosion problems which would result if the throttling were effected in the flow past annular ring 66. It will be noted that the only sliding friction in this case is the friction between valve closure 58 and rod 61 with guide bars 59 and opening 60 respectively. Relatively large clearances are provided in this case and only a very small amount of actual bearing surface is required. The valve closure itself moves toward and away from the opening and thus entirely eliminates the vexatious problem of preventing solids from getting between surfaces that have to fit closely upon and slide against each other.

Figure 4:
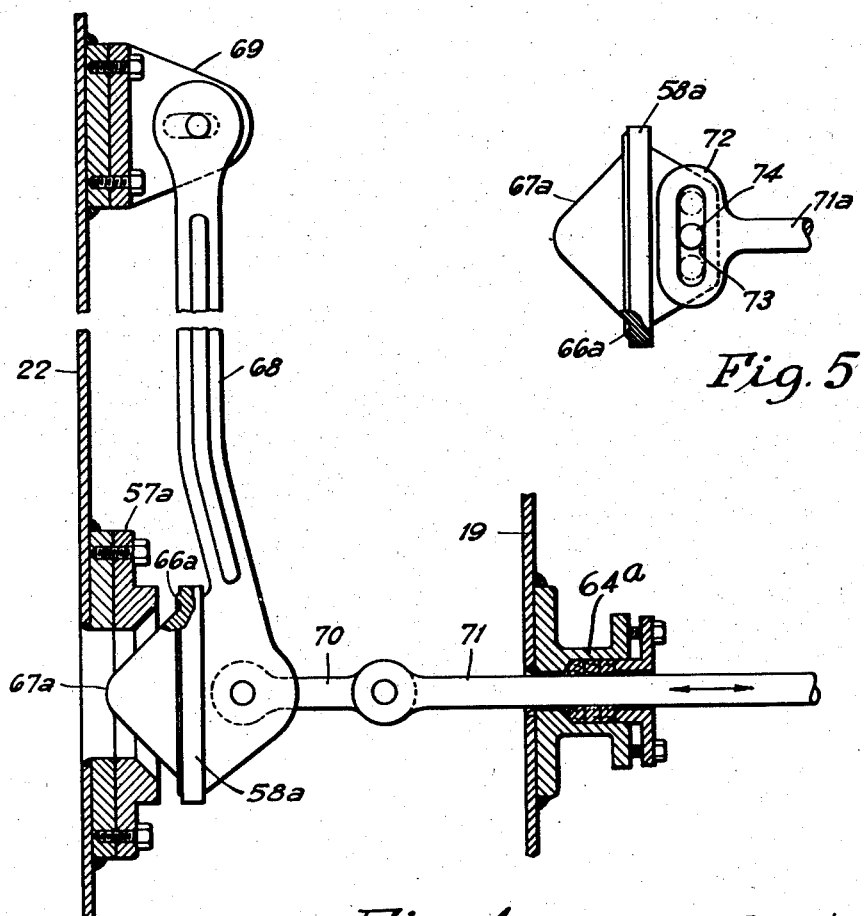
Figure 4 is another embodiment of such valve structure.

In Figure 4 I have illustrated another modification wherein the valve seat and valve closure are substantially the same as hereinabove described and are hence designated by similar reference characters but wherein the valve closure is both guided and supported by arm 68 which is loosely pivoted on lug 69, this lug being welded or otherwise secured to the wall of conduit 22 above the valve seat 67a. A connecting rod 70 is pivotally mounted both to the valve closure and to valve operating rod 71, the latter extending through a packing gland 64a secured to vessel wall 19. The operation of this valve is the same as hereinabove described in connection with Figure 3 except that no sliding friction is encountered by the valve guides.

Figure 5:
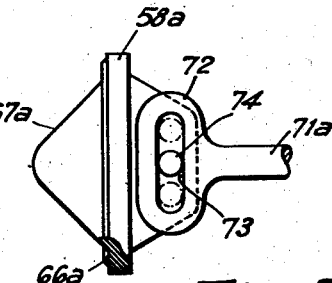
Figure 5 is a modification of valve operating means which might be employed in the structures of Figure 3 or 4.

In Figure 5 I have illustrated an embodiment wherein the connecting rod 70 is dispensed with and wherein the inner end of operating rod 71a has an enlarged end 72 which is provided with a vertical slot 73 for engaging a pin 74 on the valve closure. The pin may move upwardly or downwardly with differential expansion without changing the amount of valve opening and without placing any strain on the valve operating rod.

The valve structures hereinabove described are merely by way of illustration and they are given by way of example and not by way of limitation. A sleeve might be mounted around conduit wall 22 having openings which may either register with the openings in the conduit or be moved into position for closing the openings but such valves are likely to stick or become "frozen" because it is very difficult to prevent powdered solids from getting between the sleeve and the conduit wall. Conduit 22 may be open in its bottom end and a slidable pipe section movable upwardly and downwardly in conduit 21 may enable the desired throttling and valve closure but here again the slidable pipe section is likely to stick or become "frozen" because of solid particles getting between slidable surfaces. By employing rings at spaced points between the sliding surfaces and introducing steam or other pressuring gas between said rings the solids may be prevented to a certain extent at least from entering the space between sliding surfaces but generally speaking I much prefer to employ a valve closure which moves toward and away from a valve opening so that there will be no tendency for the valve to stick or "freeze."

While I have described a specific example of my invention in considerable detail, it should be understood that the invention is not limited to this particular example nor to the particular structure or operating conditions described in connection therewith. Standpipe 26 for example may be a channel along the wall of vessel 16 instead of a tube depending from element 23. The "floating" standpipe 26 offers the advantage of freedom from stresses and strains due to differential expansion but in some instances it may be desirable to employ external standpipes particularly when the regenerator is of larger diameter than the reactor. The external standpipe may communicate at its base directly with transfer line 13 in which case the regenerated catalyst will be carried into the reactor with the charging stock vapors and this charging stock stream may be distributed in the reactor by a distributor similar to distributor 25 in the regenerator. In fact I may employ such a distributor in the reactor instead of using distributor 15 and introduce catalyst from internal standpipe 26 to a point below such distributor plate instead of introducing it directly into the dense phase in the reaction zone. By making the regenerator of larger diameter (even up to 40 or 50 feet or more) the shallower suspended dense catalyst phase may be employed and further savings in compression costs effected. Numerous other modifications of the invention and alternative operating conditions will be apparent to those skilled in the art from the above detailed description.

Make-up catalyst may be added to the system by a line (not shown) entering the regenerator at a low, intermediate or upper level, such catalyst preferably being so introduced by a carrier gas such as air, flue gas or steam, the carrier gas being removed through the regeneration gas line 36. In starting up the system a fuel may be introduced into the regenerator along with compressed air in order to heat the catalyst up to regeneration temperature. Catalyst circulation may then be initiated while steam or hydrocarbon gases are passed through the regenerator section and more catalyst is being added to the regenerator. When the entire system has reached the desired operating temperature level the charging stock vapors may be cut into the system. Make-up catalyst may be supplied from time to time to the regenerator but catalyst losses in this system are very small.

My invention is by no means limited to the specific example hereinabove set forth, and even in this example the operating variables such as catalyst-to-oil ratios, temperatures, pressures, space velocities, stripping rates, aeration rates, etc., may vary throughout a considerable range. The whole system may be operated at higher pressures, in which case diameters of reactor, regenerator and stripper may be decreased and heights correspondingly increased. It may be operated at lower pressure with corresponding changes in dimensions. Various types of distributors may be employed in place of or in addition to perforated plates. Numerous other modifications and alternative conditions will be apparent from the above description to those skilled in the art.

I claim:

1. In apparatus suitable for effecting catalytic conversion of hydrocarbons with solid catalyst of small particle size, a vertical cylindrical conversion chamber having inclined bottom walls and top walls, a vertical cylindrical regeneration chamber superimposed above said conversion chamber, the top walls of the conversion chamber forming at least a portion of the bottom walls of the regeneration chamber, a conduit extending downwardly through the conversion chamber and communicating at its upper end with the inclined walls which form the base of the regeneration chamber, a cylindrical stripping chamber surrounding said conduit with its upper end open to said conversion chamber and with its lower walls extending below the inclined walls of the conversion chamber, an expansion joint at the base of said stripping chamber, a compressed air line extending through said expansion joint to said conduit whereby relative movement between the conduit and the stripping chamber walls due to differential thermal expansion may be accommodated, at least one opening in the intermediate part of the stripping chamber wall to provide communication between the conversion chamber and an upper part of the stripping chamber, means for introducing steam at a low point in the stripping chamber, a valve at a low point in said conduit for regulating the flow of catalyst from the stripping chamber to the conduit, means for distributing fluids passed upwardly through said conduit into said regeneration chamber, a standpipe communicating at its upper end with said regeneration chamber at a low point therein, means for removing regeneration gases from the upper part of the regeneration chamber, means for introducing catalyst from the base of said standpipe into said conversion chamber, means for distributing charging stock vapors at the base of said conversion chamber and means for removing conversion products from the upper end of said conversion chamber.

2. The apparatus of claim 1 wherein the valve comprises a valve seat, a valve closure, and means extending through a chamber wall for moving said valve closure toward and away from said valve seat, said last-named means being constructed and arranged to permit relative movement between said conduit and said chamber wall due to thermal expansion and contraction.

3. The apparatus of claim 1 wherein said valve comprises a valve seat having an inclined surface and a closure surface, a valve closure movably mounted for movement toward and away from said valve seat, said valve closure having inclined surfaces for cooperating with the inclined surface of the valve seat for effecting a throttling action and having a closure ring for cooperating with said closure surface to effect a seal and means extending through a chamber wall for operating said valve, said last-named means being constructed and arranged to make allowance for thermal expansion and contraction.

4. In apparatus of the class described, an upper cylindrical contacting chamber provided with a conical base, a conduit extending downwardly from said conical base, outer walls surrounding said conduit and extending from said conical base downwardly to form at least one lower contacting chamber, an expansion joint at the juncture of the base of said walls with the base of said conduit, a valve in said conduit inside of said lower contacting chamber but adjacent the bottom thereof, valve operating means extending from said valve to a point outside of said lower contacting chamber and a connection between said valve and said valve operating means for allowing relative vertical movement of the conduit with respect to the outer walls.

5. The apparatus of claim 4 wherein the connection comprises a pivotally mounted connecting rod.

6. The apparatus of claim 4 wherein the connection comprises a pin movably mounted in a vertical slot.

7. The apparatus of claim 4 which includes a cylindrical baffle extending upwardly in said lower chamber around said conduit with at least one opening in said baffle at an intermediate level.

8. In apparatus for contacting finely divided solids with a plurality of gasiform streams, an upper contacting chamber, a lower contacting chamber immediately beneath said upper chamber, a third contacting chamber extending upwardly into said lower contacting chamber and communicating therewith both at its top and through at least one lateral upper opening spaced from the top thereof, a conduit extending from the lower part of the upper chamber through the upper part of the lower chamber and through said third chamber, a valve for regulating flow of solids from the lower part of said third chamber to said conduit through a lateral lower opening therein, means for controlling the position of said valve while allowing for relative vertical movement of said conduit and the outer wall of said third chamber due to thermal expansion and contraction thereof, means for introducing the first gasiform stream into the lower end of said conduit, means for introducing a second gasiform stream into the lower contacting chamber, means for introducing a third gasiform stream into the third contacting chamber, means for withdrawing a gasiform stream from the upper part of the lower chamber, separate means for withdrawing a gasiform stream from the upper chamber and a second conduit extending directly from the upper chamber to the lower chamber for downwardly transferring solids.

9. The apparatus of claim 8 wherein the communication between the lower contacting chamber and the third contacting chamber through at least one lateral opening spaced from the top of the third contacting chamber is of such cross-sectional area as to provide a solids flow from the lower chamber therethrough to the third chamber at a velocity in the range of 2 to 12 feet per second.

10. Apparatus for effecting the contacting of finely divided solids with gasiform streams which apparatus comprises an upper contacting chamber, a first conduit communicating with the lower portion of said chamber and extending downwardly therefrom, an inner contacting chamber surrounding said first conduit, said inner chamber communicating with said first conduit adjacent its lower end and communicating at its upper end with an outer contacting chamber positioned below the upper chamber, the outer contacting chamber surrounding an upper portion of said inner chamber and also surrounding an upper portion of said first conduit, a second conduit extending from an intermediate point in said upper chamber downwardly through at least a portion of said outer chamber, flow control means in said second conduit, means for controlling flow through the communication between the inner contacting chamber and the first conduit while allowing for relative vertical movement of said first conduit and the outer wall of said inner contacting chamber due to thermal expansion and contraction thereof, means for introducing a gasiform stream to the first conduit, means for discharging a gasiform stream from the top of the first chamber, means for introducing separate gasiform streams at low points in the inner and outer chambers and means for discharging a gasiform stream from the upper part of the outer chamber.

11. The apparatus of claim 10 in which the means for controlling flow through the communication includes cone-shaped valve and valve seat throttling elements and a peripheral sharp edged closure element.

FRED W. SCHEINEMAN.

REFERENCES CITED

The following references are of record in the file of this patent:

UNITED STATES PATENTS

| Number | Name | Date |
| --- | --- | --- |
| 2,331,433 | Simpson et al. | Oct. 12, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,358,497 | Egloff | Sept. 19, 1944 |
| 2,361,978 | Swearingen | Nov. 7, 1944 |
| 2,363,874 | Krebs | Nov. 28, 1944 |
| 2,367,694 | Snuggs | Jan. 23, 1945 |
| 2,377,657 | Watts | June 5, 1945 |
| 2,399,050 | Martin | Apr. 23, 1946 |

FOREIGN PATENTS

| Number | Country | Date |
| --- | --- | --- |
| 115,689 | Australia | Aug. 6, 1942 |